(12) United States Patent
Kenkare et al.

(10) Patent No.: US 8,031,549 B2
(45) Date of Patent: Oct. 4, 2011

(54) INTEGRATED CIRCUIT HAVING BOOSTED ARRAY VOLTAGE AND METHOD THEREFOR

(75) Inventors: Prashant U. Kenkare, Austin, TX (US); Troy L. Cooper, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 503 days.

(21) Appl. No.: 12/233,913

(22) Filed: Sep. 19, 2008

(65) Prior Publication Data

US 2010/0072816 A1 Mar. 25, 2010

(51) Int. Cl.
*G11C 5/14* (2006.01)
(52) U.S. Cl. ............... 365/226; 365/189.11; 365/189.09
(58) Field of Classification Search ............. 365/189.09, 365/189.11, 226
See application file for complete search history.

(56) References Cited

U.S. PATENT DOCUMENTS

| | | | |
|---|---|---|---|
| 5,303,190 A | 4/1994 | Pelley, III | |
| 5,652,947 A | 7/1997 | Izumizaki | |
| 5,673,225 A * | 9/1997 | Jeong et al. | 365/189.11 |
| 5,726,944 A | 3/1998 | Pelley, III et al. | |
| 5,889,701 A * | 3/1999 | Kang et al. | 365/185.18 |
| 6,154,413 A | 11/2000 | Longwell et al. | |
| 6,249,475 B1 | 6/2001 | Atwell et al. | |
| 6,272,670 B1 | 8/2001 | Van Myers et al. | |
| 6,477,104 B1 | 11/2002 | Atwell et al. | |
| 6,552,947 B2 | 4/2003 | Longwell et al. | |
| 6,577,535 B2 | 6/2003 | Pasternak | |
| 2001/0022741 A1* | 9/2001 | Takeuchi et al. | 365/145 |
| 2004/0201414 A1 | 10/2004 | Pasotti et al. | |
| 2004/0207458 A1 | 10/2004 | Origasa et al. | |
| 2006/0174140 A1 | 8/2006 | Harris et al. | |

OTHER PUBLICATIONS

PCT Application No. PCT/US2009/052812; Search Report and Written Opinion dated Feb. 19, 2010.

* cited by examiner

*Primary Examiner* — J. H. Hur
(74) *Attorney, Agent, or Firm* — Daniel D. Hill

(57) ABSTRACT

An integrated circuit comprises a global power supply conductor, a plurality of circuit blocks, a plurality of voltage converters, and control logic. The global power supply conductor is configured to distribute a supply voltage. The circuit blocks are selectively coupled to the global power supply conductor. The plurality of voltage converters are coupled to the global power supply conductor. An output voltage of individual voltage converters of the plurality of voltage converters are selectively coupled to one or more of the plurality of circuit blocks. The control logic is configured to control the selective coupling of at least one of the supply voltage and the output voltage of individual voltage converters of the plurality of voltage converters to corresponding ones of the plurality of circuit blocks. Also, the control logic controls a magnitude of the output voltage of individual voltage converters of the plurality of voltage converters.

19 Claims, 4 Drawing Sheets

INTEGRATED CIRCUIT HAVING BOOSTED ARRAY VOLTAGE AND METHOD THEREFOR

BACKGROUND

1. Field

This disclosure relates generally to integrated circuits, and more specifically, to an integrated circuit having a boosted array voltage and method therefor.

2. Related Art

Static random access memories (SRAMs) are generally used in applications requiring high speed, such as memory in a data processing system. Each SRAM cell stores one bit of data and is implemented as a pair of cross-coupled inverters. The SRAM cell is only stable in one of two possible voltage levels. The logic state of the cell is determined by whichever of the two inverter outputs is a logic high, and can be made to change states by applying a voltage of sufficient magnitude and duration to the appropriate cell input. The stability of a SRAM cell is an important issue. The SRAM cell must be stable against transients, process variations, soft error, and power supply fluctuations which may cause the cell to inadvertently change logic states. Also, the SRAM cell must provide good stability during read operations without harming the ability to write to the cell.

However, today's integrated circuits are required to operate at increasingly lower power supply voltages. Also, logic circuits on an integrated circuit can generally operate with lower supply voltages than SRAM arrays. The lower power supply voltages can reduce the stability of the SRAM cell. Also, SRAM cells operating at the lower supply voltages are more susceptible to soft error and process variations. In addition, production yields can be reduced because fewer cells will operate reliably at the reduced voltages One way to solve the above problems is to operate the memory array at a higher voltage than the rest of the integrated circuit. However, operating the SRAM arrays at a higher voltage can consume more power.

Therefore, what is needed is an integrated circuit and method that solves the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
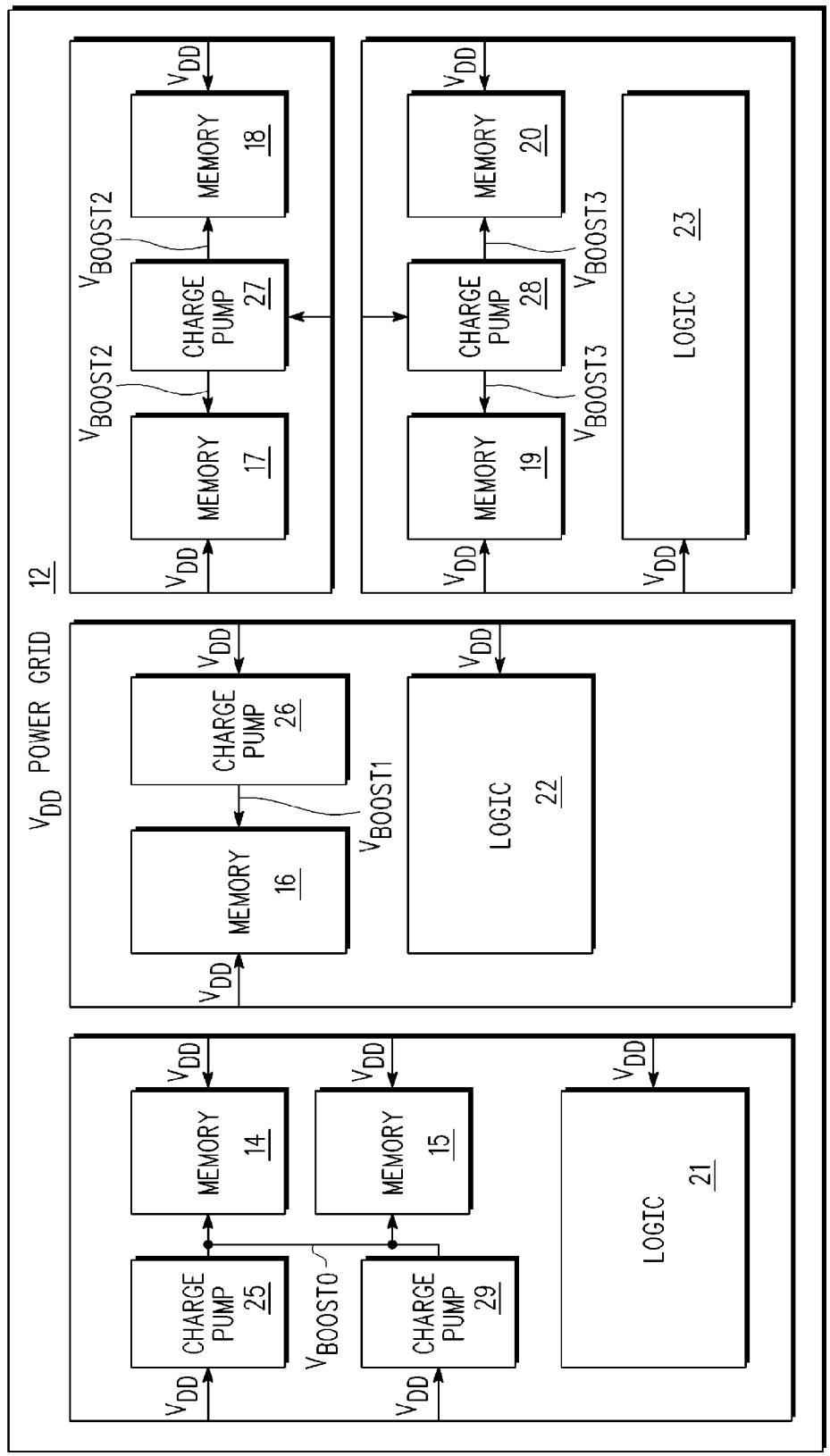
FIG. 1 illustrates, in block diagram form, an integrated circuit in accordance with an embodiment.

Generally, there is provided, an integrated circuit having logic circuits and memory circuits. In one embodiment, the integrated circuit is a system on a chip (SOC). A charge pump and voltage detector is associated with each memory array. The charge pumps are each independently controlled to selectively provide a boosted supply voltage to supply voltage terminals of the memory cells. The memory arrays can be selectively coupled to receive a boosted supply voltage or a normal supply voltage. Also, a voltage detector is coupled to an output of each of the charge pumps to detect the boosted supply voltage. In response to detecting that the boosted supply voltage is below a predetermined voltage, the voltage detector causes the charge pump to increase the supply voltage of a memory array associated with the charge pump.

By independently controlling the charge pumps, selected memory arrays can receive an adjustable boosted supply voltage as needed. The selection of memory arrays requiring a boosted supply voltage can be determined by monitoring the low voltage production yield of memory cells contained within the memory arrays. The low voltage production yield can be monitored immediately following fabrication of the integrated circuit or even by periodic testing of the integrated circuits after it has already been shipped to the customer. Those memory arrays that show bitcell failures at a relatively low supply voltage are likely to benefit from a local power supply which is boosted with respect to the normal supply voltage. However, memory arrays that do not fail at the low supply voltage are unlikely to benefit from a boosted supply and it is preferred that these memory arrays receive a normal supply voltage. This approach can improve production yields while minimizing the overall power consumed by the integrated circuit. It is understood that "low voltage" can also mean the nominal supply voltage of the integrated circuit.

The integrated circuit described herein can be formed on any semiconductor material or combinations of materials, such as gallium arsenide, silicon germanium, silicon-on-insulator (SOI), silicon, monocrystalline silicon, the like, and combinations of the above.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or a letter "B" following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

In one aspect, there is provided, an integrated circuit comprising: a global power supply conductor configured to distribute a supply voltage; a plurality of circuit blocks, the circuit blocks being selectively coupled to the global power supply conductor; a plurality of voltage converters coupled to the global power supply conductor, wherein an output voltage of individual voltage converters of the plurality of voltage converters are selectively coupled to one or more circuit blocks of the plurality of circuit blocks; and control logic configured to (i) control the selective coupling of at least one of (i)(a) the supply voltage and (i)(b) the output voltage of individual voltage converters of the plurality of voltage converters to corresponding ones of the plurality of circuit blocks, and (ii) control a magnitude of the output voltage of individual voltage converters of the plurality of voltage converters. The control logic may independently control the magnitude of the output voltage of individual voltage converters of the plurality of voltage converters according to local power supply requirements of corresponding one or more selectively coupled circuit blocks. The individual voltage converters may be located physically proximate to the corresponding one or more selectively coupled circuit blocks, where physically proximate may further comprise being immediately adjacent. The supply voltage may comprise a first voltage, and the output voltage of an individual voltage converter may comprise a second voltage. The second voltage may comprise a magnitude that is different than a magnitude of the first voltage. The plurality of voltage converters may comprise charge pumps. At least one of the circuit blocks may include a charge storage capacitor, and wherein the charge storage capacitor may be coupled to the output voltage of a corresponding charge pump of the plurality of charge pumps. The output voltage of individual charge pumps may comprise a voltage magnitude greater than a magnitude of the supply voltage. The plurality of voltage converters may comprise voltage regulators. The circuit blocks may comprise memory circuits, the memory circuits including at least one memory array. The memory circuits may comprise static random access memory (SRAM). The control logic may include a control storage element having a number of bit fields, each bit field including one or more control bits adapted to provide a desired control of (i) the selective coupling and (ii) the magnitude of output voltage of individual voltage converters. The control logic may further comprise a voltage detector per at least one circuit block of the plurality of circuit blocks, wherein the voltage detector is responsive to a control input and an input voltage to the corresponding at least one circuit block for producing a magnitude control signal that is input to the corresponding voltage converter, the integrated circuit further comprise at least one multiplexer per one or more circuit blocks of the plurality of circuit blocks, the at least one multiplexer having first and second inputs and an output, the first input being coupled to the global power supply conductor, the second input being coupled to the output voltage of an individual voltage converter of a corresponding one or more circuit blocks of the plurality of circuit blocks, and the output being coupled to the corresponding one or more circuit blocks of the plurality of circuit blocks.

In another aspect, there is provided, an integrated circuit comprising: a global power supply conductor configured to distribute a supply voltage; a plurality of circuit blocks, the circuit blocks being selectively coupled to the global power supply conductor; a plurality of voltage converters coupled to the global power supply conductor, wherein an output voltage of individual voltage converters of the plurality of voltage converters are selectively coupled to one or more circuit blocks of the plurality of circuit blocks; and control logic configured to (i) control the selective coupling of at least one of (i)(a) the supply voltage and (i)(b) the output voltage of individual voltage converters of the plurality of voltage converters to corresponding ones of the plurality of circuit blocks, and (ii) control a magnitude of the output voltage of individual voltage converters of the plurality of voltage converters, wherein the control logic independently controls the magnitude of the output voltage of individual voltage converters of the plurality of voltage converters according to local power supply requirements of corresponding one or more selectively coupled circuit blocks, the control logic including a control storage element having a number of bit fields, each bit field including one or more control bits adapted to provide a desired control of (i) the selective coupling and (ii) the magnitude of output voltage of individual voltage converters.

In yet another aspect, there is provided, a method for providing local supply voltages in an integrated circuit comprising: configuring a global power supply conductor to distribute a supply voltage; selectively coupling a plurality of circuit blocks to the global power supply conductor; coupling a plurality of voltage converters to the global power supply conductor, wherein an output voltage of individual voltage converters of the plurality of voltage converters are selectively coupled to one or more circuit blocks of the plurality of circuit blocks; and controlling, via control logic (i) the selective coupling of at least one of (i)(a) the supply voltage and (i)(b) the output voltage of individual voltage converters of the plurality of voltage converters to corresponding ones of the plurality of circuit blocks, and (ii) a magnitude of the output voltage of individual voltage converters of the plurality of voltage converters, wherein controlling includes independently controlling the magnitude of the output voltage of individual voltage converters of the plurality of voltage converters according to local power supply requirements of corresponding one or more selectively coupled circuit blocks. The step of controlling may further comprise independently controlling the magnitude of the output voltage of individual voltage converters of the plurality of voltage converters according to local power supply requirements of corresponding one or more selectively coupled circuit blocks, wherein the control logic includes a control storage element having a number of bit fields, each bit field including one or more control bits adapted to provide a desired control of (i) the selective coupling and (ii) the magnitude of output voltage of individual voltage converters. The plurality of voltage converters may comprise charge pumps, wherein at least one of the circuit blocks includes a charge storage capacitor, and wherein the charge storage capacitor is coupled to the output voltage of a corresponding charge pump of the plurality of charge pumps, and wherein the output voltage of individual charge pumps comprises a boost voltage having a magnitude greater than a magnitude of the supply voltage.

FIG. 1 illustrates, in block diagram form, an integrated circuit 10 according to an embodiment. Generally, integrated circuit 10 includes circuit blocks comprising a plurality of logic blocks and a plurality of memory blocks. More specifically, integrated circuit 10 includes memory blocks 14-20, logic blocks 21-23, and voltage converters 25-29. In the illustrated embodiment, voltage converters 25-29 comprise charge pumps. In other embodiments, the voltage converters may be voltage regulators. A power supply voltage conductor is formed as a power supply grid 12. Power supply grid 12 is formed in one or more metal layers on the integrated circuit to provide a power supply voltage VDD to each of the plurality of memory blocks 14-20, each of logic blocks 21-23, and each of the charge pumps 25-29. Logic circuits 21-23 can be any type of digital or analog circuits, such as for example, analog-to-digital converters, logic gates, arithmetic units, amplifiers, and the like. Each of charge pumps 25-29 is associated with one or more circuits, such as for example, memories 14-20. For example, charge pump 25 is selectively coupled to provide boosted supply voltage VBOOST0 to memories 14 and 15 in response to control signals from control logic including registers 50 Charge pump 26 is coupled to provide boosted supply voltage VBOOST1 to memory 16. Charge pump 27 is coupled to provide boosted supply voltage VBOOST2 to memories 17 and 18. Charge pump 28 is coupled to provide boosted supply voltage VBOOST3 to memories 19 and 20. A redundant charge pump 29 is coupled to memory arrays 14 and 15. Either of charge pumps 25 or 29 can be used to provide boosted supply voltage VBOOST0. In the event that charge pump 25 is discovered to be non-functional, redundant charge pump 29 can be substituted by, for example, blowing a fuse, setting a bit in a control register, programming a bit in a non-volatile memory, or the like. In another embodiment, both charge pumps may be used at the same time to increase the charging current if the current from one charge pump is not adequate. Each of the charge pumps are located physically proximate to one or more corresponding memories and preferably immediately adjacent.

Figure 2:
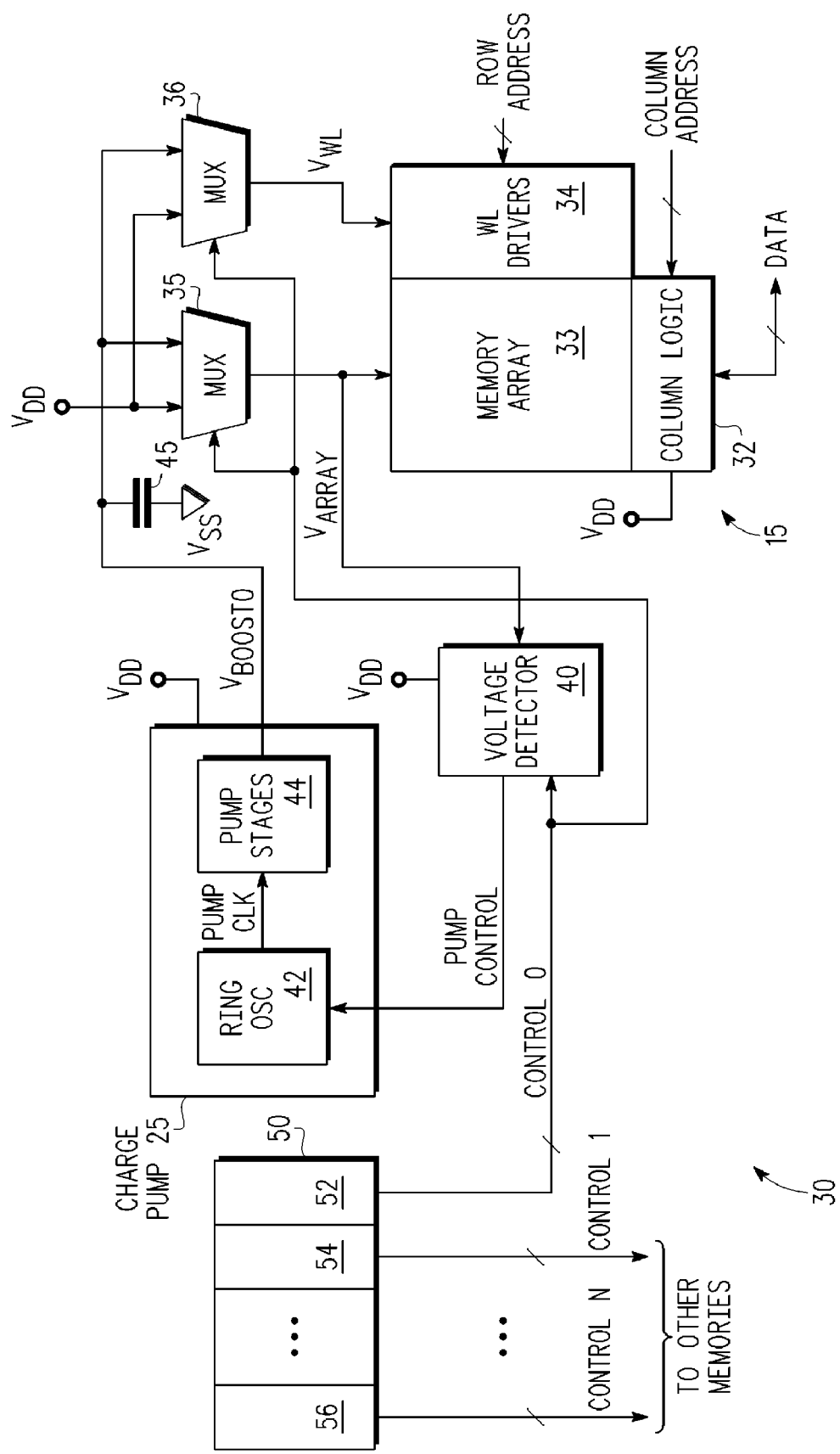
FIG. 2 illustrates, in block diagram form, a portion of the integrated circuit of FIG. 1.

FIG. 2 illustrates, in block diagram form, a portion 30 of integrated circuit 10 of FIG. 1. Portion 30 includes memory 15, charge pump 25, voltage detector 40, multiplexers 35 and 36, capacitor 45, and control storage element 50. In the illustrated embodiment, control storage element 50 is a register and provides a selective coupling of a boosted voltage to a corresponding memory and a magnitude of the boosted voltage. Memory 15 includes memory array 33, column logic 32, and word line drivers 34. For the purposes of simplicity and clarity, memory 15 has been greatly simplified. In a preferred embodiment, memory array 33 is a conventional SRAM array and includes a plurality of SRAM cells organized in rows and columns, where a column includes a bit line pair and all of the memory cells coupled to the bit line pair and a row includes a word line and all of the memory cells coupled to the word line. In another embodiment, the memory arrays may include any type of memory that benefits from a boosted supply voltage as compared to other circuits on the integrated circuit. Word line drivers 34 receive a plurality of row address signals labeled "ROW ADDRESS", and in response, selected one of the word lines during a write or read access to memory array 33. Column logic 32 receives a column address labeled "COLUMN ADDRESS" and selects a column during a read or write access. The column logic includes column decoders, sense amplifiers, precharge and equalization circuits, bit line loads, and other circuits necessary for accessing memory array 33. In the illustrated embodiment, all of the other memories in integrated circuit 10 are similar to memory 15. However, in other embodiments, there could be memories that are unaffiliated with any boost circuitry. Multiplexer 35 selectively couples one of either boosted output voltage VBOOST0 or VDD to memory array 33 in response to receiving a predetermined bit from CONTROL 0. Output voltage VBOOST0 is at a different magnitude than power supply voltage VDD, and preferably VBOOST0 has a greater magnitude than VDD. Multiplexer 36 selectively couples one or either VBOOST0 or VDD to word line drivers 34. Boosting the word line above the supply voltage during an access to the memory array can reduce the time it takes to access the memory for a read or write operation. In another embodiment, the boosted supply voltage VBOOST0 may be provided only to columns selected for a read operation as determined by the column address. Columns selected for a write operation are supplied by VDD. In yet another embodiment, all columns receive VDD during a standby operation where the array is neither being read or written.

Register 50 includes a plurality of bit fields for storing logic bits for controlling the operation of a plurality of charge pumps such as charge pumps 25-29. For example, bit field 52 includes one or more bits coupled to provide control signals CONTROL 0 to voltage detector 40. Also, bit field 54 includes one or more bits coupled to provide control signals CONTROL 1 to another memory. In addition, bit field 56 includes one or more bits coupled to provide control signals CONTROL N to another memory of the integrated circuit.

Charge pump 25 is a conventional charge pump and includes ring oscillator 42 and pump stages 44. Ring oscillator 42 generates a clock signal labeled "PUMP CLK" in response to the supply voltage VDD. The pump clock is turned on and off by control signal PUMP CONTROL from voltage detector 40. Pump stages 44 includes one or more pump stages to pump up the supply voltage VDD from a lower voltage to a higher voltage VBOOST0. A magnitude of the output voltage VBOOST0 is controlled by controlling a frequency of ring oscillator 42. For example, pump stages 44 may receive VDD as an input of about 0.6 volts and provide VBOOST0 at about 0.9 volts. Capacitor 45 has a first plate electrode coupled to the output of charge pump 25, and a second plate electrode coupled to VSS. Capacitor 45 functions to maintain the voltage VBOOST0 provided to the input of multiplexers 35 and 36.

In register 50 one or more bits of bit field 52 are used to selectively enable and control the output of charge pump 25. Register 50 may be programmable by a user or a processor. Register 50 may also be programmable by either an external tester or internal test logic that identifies the memory arrays which would benefit from a boosted supply voltage in order to improve low voltage production yield. Register 50 includes bit fields for controlling each individual charge pump or group of charge pumps according to local power supply requirements of corresponding memories coupled to the charge pumps. Also, one of more bits of bit field 52 is used to control multiplexer 35 to control whether memory array 33 is powered by boosted voltage VBOOST0 or by supply voltage VDD. For example, charge pump 25 may be disabled and multiplexer 35 used to decouple boosted voltage VBOOST0 and couple power supply voltage VDD to a power supply voltage terminal of memory array 33. In the case where memory array 33 includes a plurality of conventional six transistor SRAM cells, the boosted voltage VBOOST0 is provided to supply terminals of each cell. Also, one or more bits of bit field 52 may be used to selectively control multiplexer 36 to selectively couple one of boosted voltage VBOOST0 and power supply voltage VDD to word line drivers 34 during, for example, a read access or a write access to memory array 33. That is, when memory array 33 is being read, a selected word line receives boosted voltage VBOOST0 instead of the power supply voltage VDD. The boosted word line voltage improves a write margin and the speed of writing to the selected cell. In addition, in a preferred embodiment, bit field 52 includes one or more bits for independently controlling the output voltage level, or magnitude, of VBOOST0 as discussed in connection with FIG. 3 below. Also, one or more bits of bit field 52 are used for controlling the frequency of PUMP CLK produced by ring oscillator 42. In other embodiments, register 50 can be implemented using any type of memory device or control logic. For example, register 50 may be any type of volatile or non-volatile random access memory, such as for example, flash, dynamic random access memory (DRAM), or SRAM. Also, register 50 may be implemented as fuses or may be external to integrated circuit 10.

In the illustrated embodiment, charge pump 25 is used to provide the boosted supply voltage. In another embodiment, charge pump 25 can be replaced with another type of voltage converter, such as for example, a voltage regulator. Also, in an effort to prevent an over-voltage problem, a clamp circuit (not shown) may be included with charge pump 25 to clamp VBOOST0 below or equal to a predetermined voltage.

Figure 3:
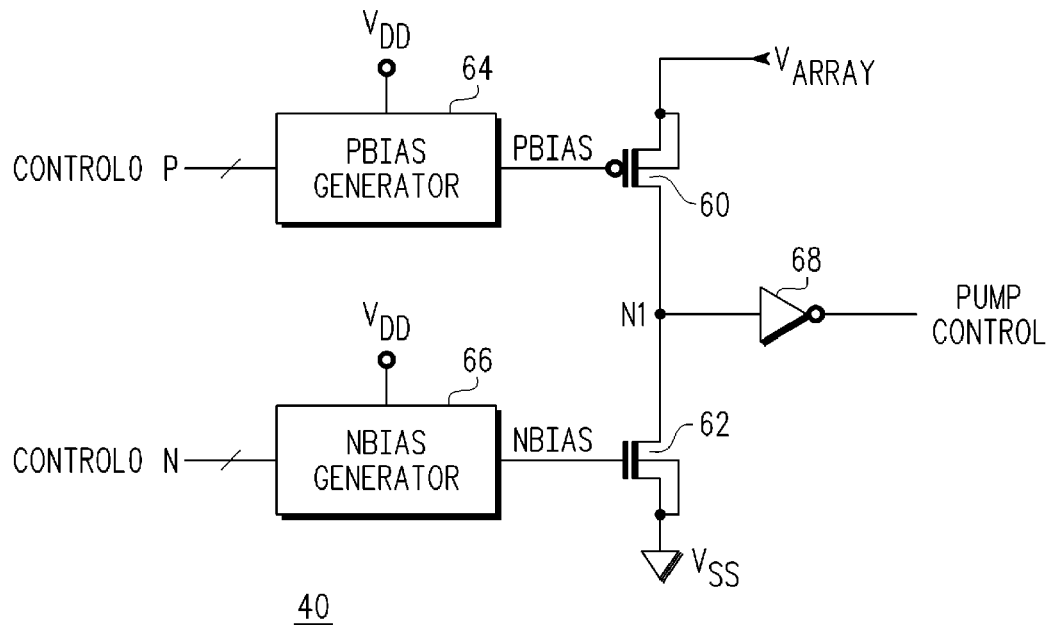
FIG. 3 illustrates, in partial block diagram form and partial schematic diagram form, the voltage detector of FIG. 2.

FIG. 3 illustrates, in partial block diagram form and partial schematic diagram form, voltage detector 40. Voltage detector 40 includes bias generator 64, bias generator 66, P-channel transistor 60, N-channel transistor 62, and inverter 68. Bias generator 64 has a plurality of input terminals for receiving control bits labeled "CONTROL 0 P", a supply voltage terminal labeled "VDD", and an output terminal for providing a bias voltage labeled "PBIAS". Bias generator 66 has a plurality of input terminals for receiving control bits labeled "CONTROL 0 N", a supply voltage terminal labeled "VDD", and an output terminal for providing a bias voltage labeled "NBIAS". P-channel transistor 60 has a first current electrode (source) for receiving array supply voltage VARRAY, a control electrode (gate) coupled to receive bias voltage PBIAS, and a second current electrode (drain). N-channel transistor 62 has a first current electrode (DRAIN) coupled to the second current electrode of transistor 60 at a node labeled N1, a control electrode (gate) coupled to receive bias voltage NBIAS, and a second current electrode coupled to a power supply voltage terminal labeled "VSS". Transistor 60 and transistor 62 form an inverter with an output node N1. In the illustrated embodiment, VDD is a positive voltage and VSS is ground. In other embodiments, the power supply voltage can be different. Inverter 68 has an input coupled to the second current electrode of transistor 60, and an output for providing pump control signal PUMP CONTROL to an input of ring oscillator 42.

In operation, control bits CONTROL0 P controls the voltage of bias voltage PBIAS and control bits CONTROL0 N controls the voltage of bias voltage NBIAS. Control bits CONTROL0 P and CONTROL0 N are provided as part of control signals CONTROL 0 from register bit field 52 in FIG. 2. In the illustrated embodiment, CONTROL0 P includes four bits and CONTROL0 N includes four bits. In other embodiments, the number of bits can be different. The bias voltages provided to the gates of transistors 60 and 62 determine their relative conductances thereby determining their trip point for a given magnitude of VARRAY. Hence, the voltage at node N1 is determined by NBIAS, PBIAS, and VARRAY. The level of the voltage at node N1 determines the logic state of the output of inverter 68. If the voltage provided at node N1 is low, indicating that the array voltage is low, then the output of inverter 68 is a logic high, causing pump signal PUMP CONTROL to enable the operation of charge pump 25. If the voltage at node N1 is high, indicating that the array voltage is high, then the output of inverter 68 is a logic low, causing pump signal PUMP CONTROL to disable the operation of charge pump 25. The bias voltages to transistors 60 and 62 determine the voltage at node N1, and thus the point at which charge pump 25 is turned on.

Figure 4:
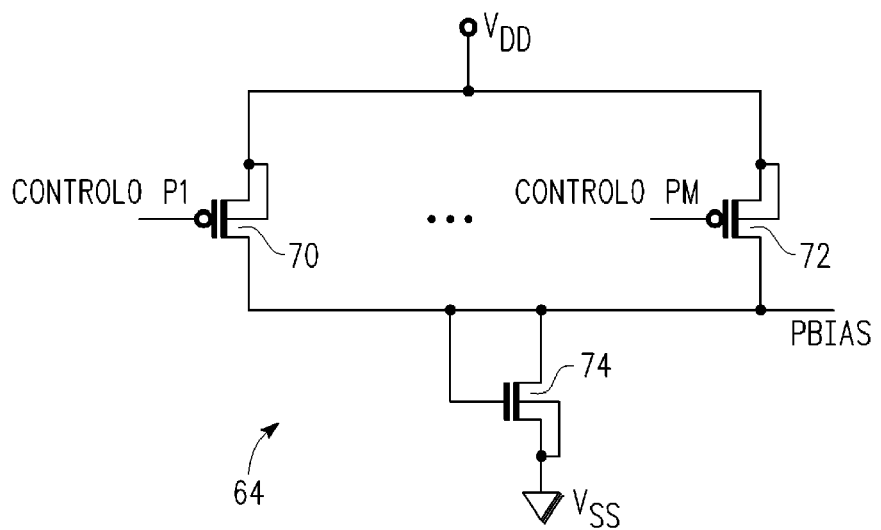
FIG. 4 illustrates, in schematic diagram form, the PBIAS generator of FIG. 3.

FIG. 4 illustrates, in schematic diagram form, one embodiment of PBIAS generator 64 of FIG. 3. Note that FIG. 4 illustrates only one embodiment of PBIAS generator 64. Those skilled in the art will know there are other ways to generate a bias voltage. PBIAS generator 64 includes a plurality of parallel-connected P-channel transistors, including parallel-connected transistors 70 and 72, coupled between VDD and an output terminal for providing PBIAS. NBIAS generator 66 is implemented similarly. Each control gate of the plurality of parallel-connected transistors is coupled to receive one bit of multi-bit control signals CONTROL0 P1-CONTROL0 PM. For example, a gate of transistor 70 is coupled to receive CONTROL0 P1 and a gate of transistor 72 is coupled to receive CONTROL0 PM. N-channel transistor 74 has a drain and a gate coupled to the output terminal for providing PBIAS, and a source coupled to VSS. The voltage PBIAS is controlled by controlling the number of parallel-connected P-channel transistors that are conductive. Increasing the number of conductive P-channel transistors that are conductive increases the voltage of PBIAS. Likewise, decreasing the number of conductive P-channel transistors decreases the voltage of PBIAS. Alternatively, transistors 70 and 72 might be sized differently such that they possess different conductances. Control signals CONTROL0 P1 and CONTROL0 PM are then used to select either transistor 70 or transistor 72 such that the voltage level of PBIAS is changed appropriately.

Figure 5:
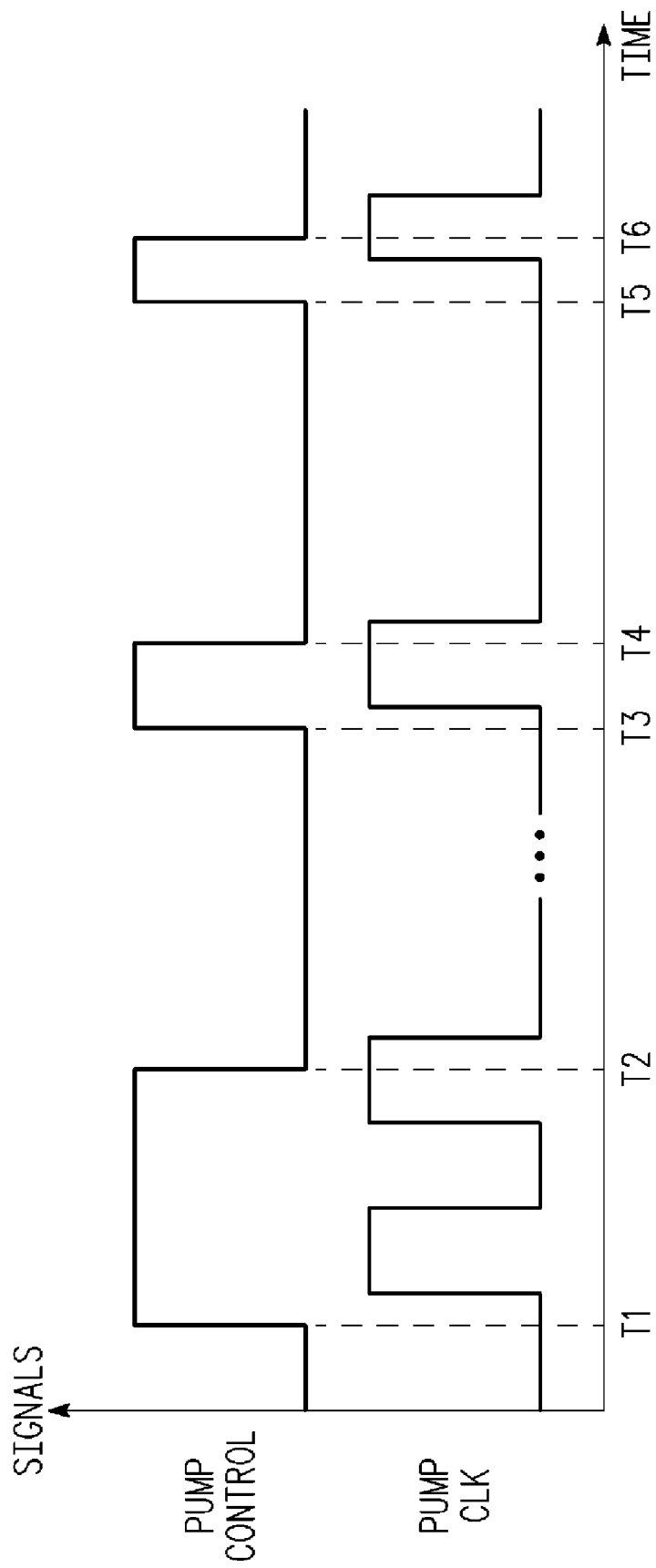
FIG. 5 illustrates a timing diagram of various signals of the integrated circuit portion of FIG. 2.

FIG. 5 illustrates a timing diagram of various signals of integrated circuit portion 30 of FIG. 2 during operation. In response to sensing a drop in array supply voltage VARRAY (not shown in FIG. 5), voltage detector 40 provides a logic high PUMP CONTROL signal to charge pump 25 at time T1. The voltage drop of VARRAY may be due to, for example, multiple accesses to memory array 33 within a short period of time. The logic high PUMP CONTROL signal increases a frequency of the PUMP CLK signal from ring oscillator 42 as can be seen in FIG. 5 between times T1 and T2. At time T2, the array voltage VARRAY is high enough to cause PUMP CONTROL to become a logic low, thus turning off ring oscillator 42. Between times T3 and T4, and between times T5 and T6, control signal PUMP CONTROL again transitions to a logic high and causes ring oscillator 42 to provide signal PUMP CLK to cause charge pump 25 to provide VBOOST0 to memory array 33 via multiplexer 35. When the voltage VARRAY is at a predetermined voltage, as determined by control signals CONTROL0 from register bit field 52, control signal PUMP CONTROL again returns to a logic low to stop charge pump 25.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Some of the above embodiments, as applicable, may be implemented using a variety of different information processing systems. For example, although FIG. 1 and the discussion thereof describe an exemplary integrated circuit, this exemplary integrated circuit is presented merely to provide a useful reference in discussing various aspects of the invention. Of course, the description of the integrated circuit has been simplified for purposes of discussion, and it is just one of many different types of appropriate integrated circuits that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the integrated circuit depicted herein is merely exemplary, and that in fact many other integrated circuits can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of integrated circuits or intermedial components. Likewise, any two components so associated can also be viewed as being "operably connected," or "operably coupled," to each other to achieve the desired functionality.

Also for example, in one embodiment, the illustrated elements of integrated circuit 10 are circuitry located on a single integrated circuit or within a same device. Alternatively, integrated circuit 10 may include any number of separate integrated circuits or separate devices interconnected with each other. For example, memory 15 may be located on a same integrated circuit as memories 14 and 16-20 or on a separate integrated circuit.

Although the invention is described herein with reference to specific embodiments, various modifications and changes can be made without departing from the scope of the present invention as set forth in the claims below. For example, in another embodiment, a voltage at the ground terminal VSS is boosted negative, or below ground, instead of boosting positive power supply voltage VDD. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. An integrated circuit comprising:
    a global power supply conductor configured to distribute a supply voltage;
    a plurality of circuit blocks, the circuit blocks being selectively coupled to the global power supply conductor;
    a plurality of voltage converters coupled to the global power supply conductor, wherein an output voltage of individual voltage converters of the plurality of voltage converters are selectively coupled to one or more circuit blocks of the plurality of circuit blocks; and
    control logic configured to
        (i) control the selective coupling of at least one of (i)(a) the supply voltage and (i)(b) the output voltage of individual voltage converters of the plurality of voltage converters to corresponding ones of the plurality of circuit blocks, and
        (ii) control a magnitude of the output voltage of individual voltage converters of the plurality of voltage converters,
    wherein the control logic independently controls the magnitude of the output voltage of individual voltage converters of the plurality of voltage converters according to local power supply requirements of corresponding one or more selectively coupled circuit blocks.

2. The integrated circuit of claim 1, wherein the individual voltage converters are located physically proximate to the corresponding one or more selectively coupled circuit blocks.

3. The integrated circuit of claim 2, wherein physically proximate comprises immediately adjacent.

4. The integrated circuit of claim 1, wherein the supply voltage comprises a first voltage, and wherein the output voltage of an individual voltage converter comprises a second voltage, wherein the second voltage comprises a magnitude that is different than a magnitude of the first voltage.

5. The integrated circuit of claim 1, wherein the plurality of voltage converters comprises charge pumps.

6. The integrated circuit of claim 5, further wherein at least one of the circuit blocks includes a charge storage capacitor, and wherein the charge storage capacitor is coupled to the output voltage of a corresponding charge pump of the plurality of charge pumps.

7. The integrated circuit of claim 5, further wherein the output voltage of individual charge pumps comprises a voltage magnitude greater than a magnitude of the supply voltage.

8. The integrated circuit of claim 1, wherein the plurality of voltage converters comprise voltage regulators.

9. The integrated circuit of claim 1, wherein the circuit blocks comprise memory circuits, the memory circuits including at least one memory array.

10. The integrated circuit of claim 9, further wherein the memory circuits comprises static random access memory (SRAM).

11. The integrated circuit of claim 1, wherein the control logic includes a control storage element having a number of bit fields, each bit field including one or more control bits adapted to provide a desired control of (i) the selective coupling and (ii) the magnitude of output voltage of individual voltage converters.

12. The integrated circuit of claim 11, wherein the control logic further comprises a voltage detector per at least one circuit block of the plurality of circuit blocks, wherein the voltage detector is responsive to a control input and an input voltage to the corresponding at least one circuit block for producing a magnitude control signal that is input to the corresponding voltage converter, the integrated circuit further comprising:
    at least one multiplexer per one or more circuit blocks of the plurality of circuit blocks, the at least one multiplexer having first and second inputs and an output, the first input being coupled to the global power supply conductor, the second input being coupled to the output voltage of an individual voltage converter of a corresponding one or more circuit blocks of the plurality of circuit blocks, and the output being coupled to the corresponding one or more circuit blocks of the plurality of circuit blocks.

13. The integrated circuit of claim 12, wherein the plurality of voltage converters comprises charge pumps.

14. The integrated circuit of claim 13, further wherein at least one of the circuit blocks includes a charge storage capacitor, and wherein the charge storage capacitor is coupled to the output voltage of a corresponding charge pump of the plurality of charge pumps.

15. The integrated circuit of claim 14, further wherein the output voltage of individual charge pumps comprises a boost voltage having a magnitude greater than a magnitude of the supply voltage.

16. An integrated circuit comprising:
a global power supply conductor configured to distribute a supply voltage;
a plurality of circuit blocks, the circuit blocks being selectively coupled to the global power supply conductor;
a plurality of voltage converters coupled to the global power supply conductor, wherein an output voltage of individual voltage converters of the plurality of voltage converters are selectively coupled to one or more circuit blocks of the plurality of circuit blocks; and
control logic configured to (i) control the selective coupling of at least one of (i)(a) the supply voltage and (i)(b) the output voltage of individual voltage converters of the plurality of voltage converters to corresponding ones of the plurality of circuit blocks, and (ii) control a magnitude of the output voltage of individual voltage converters of the plurality of voltage converters,
wherein the control logic independently controls the magnitude of the output voltage of individual voltage converters of the plurality of voltage converters according to local power supply requirements of corresponding one or more selectively coupled circuit blocks, the control logic including a control storage element having a number of bit fields, each bit field including one or more control bits adapted to provide a desired control of (i) the selective coupling and (ii) the magnitude of output voltage of individual voltage converters.

17. A method for providing local supply voltages in an integrated circuit comprising:
configuring a global power supply conductor to distribute a supply voltage;
selectively coupling a plurality of circuit blocks to the global power supply conductor;
coupling a plurality of voltage converters to the global power supply conductor, wherein an output voltage of individual voltage converters of the plurality of voltage converters are selectively coupled to one or more circuit blocks of the plurality of circuit blocks; and
controlling, via control logic
(i) the selective coupling of at least one of (i)(a) the supply voltage and (i)(b) the output voltage of individual voltage converters of the plurality of voltage converters to corresponding ones of the plurality of circuit blocks, and
(ii) a magnitude of the output voltage of individual voltage converters of the plurality of voltage converters, wherein controlling includes independently controlling the magnitude of the output voltage of individual voltage converters of the plurality of voltage converters according to local power supply requirements of corresponding one or more selectively coupled circuit blocks.

18. The method of claim 17, wherein controlling, via control logic, further comprises independently controlling the magnitude of the output voltage of individual voltage converters of the plurality of voltage converters according to local power supply requirements of corresponding one or more selectively coupled circuit blocks, wherein the control logic includes a control storage element having a number of bit fields, each bit field including one or more control bits adapted to provide a desired control of (i) the selective coupling and (ii) the magnitude of output voltage of individual voltage converters.

19. The method of claim 17, wherein the plurality of voltage converters comprise charge pumps, further wherein at least one of the circuit blocks includes a charge storage capacitor, and wherein the charge storage capacitor is coupled to the output voltage of a corresponding charge pump of the plurality of charge pumps, and further wherein the output voltage of individual charge pumps comprises a boost voltage having a magnitude greater than a magnitude of the supply voltage.

* * * * *